July 6, 1937.  H. L. PIKE  2,086,364
AUTOMATIC CLUTCH
Filed Feb. 14, 1931
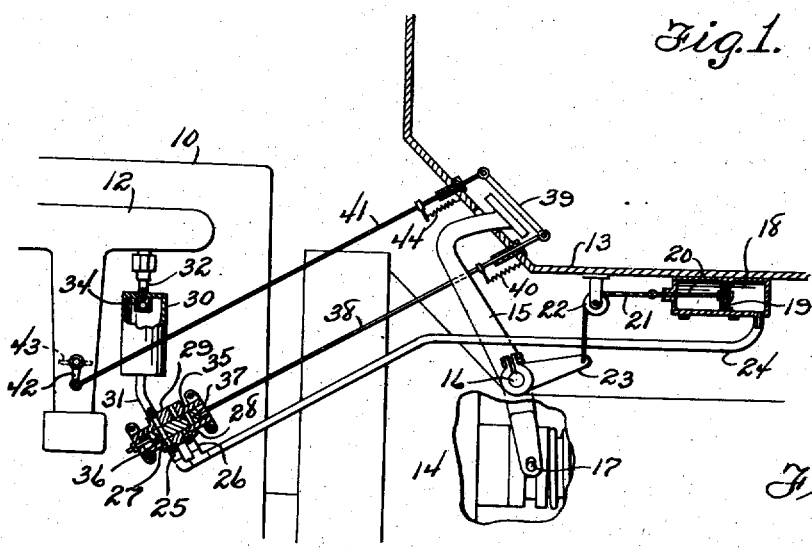
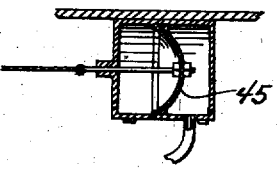
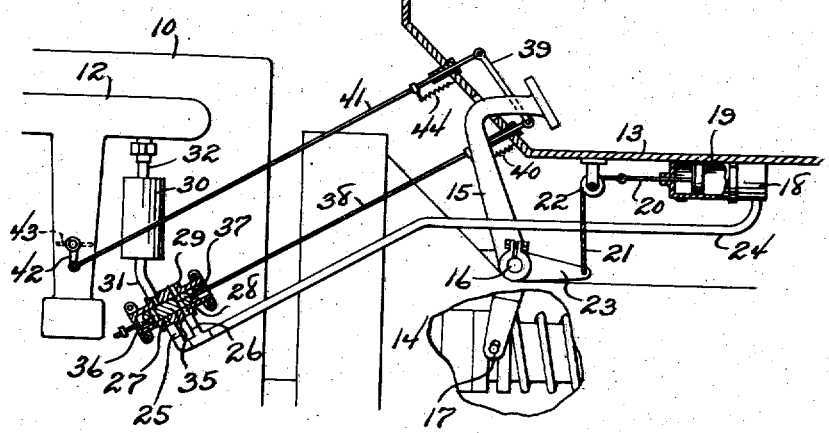
Henry Loyd Pike
INVENTOR
BY M. L. Evans
ATTORNEY Patented July 6, 1937

2,086,364

UNITED STATES PATENT OFFICE 2,086,364

AUTOMATIC CLUTCH

Henry Loyd Pike, Hampton, Va., assignor, by mesne assignments, to Bendix Products Corporation, South Bend, Ind., a corporation of Indiana Application February 14, 1931, Serial No. 515,886

12 Claims. (Cl. 192—.01)

This invention relates to motor driven vehicles and has especial reference to means for controlling the clutch, an object of the invention being to provide means operated simultaneously with the operation of the engine to release the clutch and hold the same in released position while the engine is idling, and to reengage the clutch simultaneously with the operation of the throttle valve, and thus render it unnecessary to manipulate the usual clutch pedal (which if desired may be eliminated) either for placing the vehicle in motion, or for shifting gears in traffic, or in ascending grades.

With the above and other objects in view, the invention further includes the following novel features and details of construction, to be hereinafter more fully described, illustrated in the accompanying drawing and pointed out in the appended claims.

In the drawing:—

Figure 1 is a fragmentary view partly in elevation and partly in section, showing a portion of a motor driven vehicle with the invention applied and the clutch in released position.

Figure 2 is a like view with the clutch in engaged position.

Figure 3 is a fragmentary sectional view through a modified form of suction cylinder.

Referring to the drawing in detail wherein like characters of reference denote corresponding parts, the reference character 10 indicates a portion of an engine, the intake manifold of which is indicated at 12. The numeral 13 represents a portion of the floor of the vehicle and 14 the clutch housing, while 15 represents the clutch pedal which is pivotally mounted as at 16, and is operatively connected with the clutch as shown at 17.

The reference character 18 represents a cylinder which is suitably attached beneath the floor 13 and houses a movable member or piston 19. A stem 20 extends from the piston 19 through one end of the cylinder and has attached thereto a cable 21 which passes around a guide pulley 22, and is connected with an arm 23 rigid with the clutch pedal 15.

Communicating with the other end of the cylinder 18 is a pipe 24 and this pipe is provided with branches 25 and 26 which are in communication with ports 27 and 28 respectively, provided in a valve casing 29. The port 28 is open to the atmosphere while the port 27 is in communication with a vacuum tank 30, by means of a pipe 31. A pipe 32 provides communication between the tank 30 and the intake manifold 11, communication being controlled by means of a check valve 34.

The ports 27 and 28 are controlled by a slide 35 having ports 36 and 37 which are adapted to be moved into and out of register with the ports 27 and 28 respectively. A rod 38 extends from the slide 35 and has pivotal connection with a pedal 39, a spring 40 acting to yieldingly resist movement of the rod in one direction. It is also obvious that the driver may operate the slide and throttle concurrently or successively; this in view of the fact that the pedal 39 is floating and bodily movable; in short, with the mechanism disclosed the operation of the clutch may be synchronized with that of the throttle to simulate a conventional manual operation of the clutch pedal and throttle. A rod 41 has one of its ends pivotally connected with the foot pedal 39 while the other end of this rod is pivotally connected with an arm 42 provided upon the throttle valve 43. A spring 44 also yieldingly resists movement of the rod 41 in one direction.

With the parts in the position shown in Figure 1 when the engine is started, a suction will be provided in the cylinder at one side of the piston 19, and the latter will be moved to swing the arm 23 upward and release the clutch. For this purpose, the ports 27 and 36 are in register. The gears may then be shifted into low speed, and as the pedal 39 is depressed to open the throttle and accelerate the speed of the engine, the slide 35 will be moved simultaneously until the ports 28 and 37 are in register so that the cylinder 18 will be bled and the clutch will reengage under the action of its spring. As soon as pressure is relieved from the pedal 39, the cylinder 18 will again be in communication with the exhaust manifold of the engine through the ports 27 and 36 so that further shifting of the transmission gears may be effected.

Due to the check valve 34 a vacuum will be maintained in the tank 30, so that should it be necessary or desirable to disengage the clutch when ascending a grade sufficient suction will be provided to operate the piston 19.

The invention makes it possible for a driver to take his car through heavy traffic without taking his foot from the pedal 39 which controls the throttle valve, and he may operate this valve independently of the slide 35 or vice versa.

In Figure 3, a diaphragm 45 is substituted for the piston 19, the operation being the same.

The invention is susceptible of various changes in its form, proportions and minor details of construction and the right is herein reserved to name such changes as properly fall within the scope of the appended claims.

Having described the invention what is claimed is:—

1. In a motor operated vehicle including an engine and a clutch for connecting the engine with the drive shaft of the automobile, suction controlled means operatively connected with the clutch and the intake manifold of the engine to operate the clutch, foot operated means to control the operation of the suction operated means, and means connecting the foot operated means with the throttle valve of the engine to operate said throttle valve simultaneously with or independently of the clutch.

2. In an automotive vehicle provided with a clutch and an internal-combustion engine having a throttle, power means for operating the clutch, a control valve for said power means, and common means for independently, concurrently or successively operating the throttle and control valve.

3. In an automotive vehicle provided with a clutch and an internal-combustion engine having a throttle, power means for operating the clutch, a control valve for said power means, and a manually operable member positively interconnecting the throttle and valve and selectively operable for any one of independent, concurrent or successive operations of said throttle and valve to thereby synchronize, at the will of the driver, the speed of the engine and the operation of the clutch.

4. Control mechanism for an automotive vehicle provided with an internal-combustion engine, a throttle therefor, and a clutch, and comprising in combination therewith power operated means for operating the clutch, said means comprising a fluid motor and valve means therefor, and means, operable by the foot of the driver, for selectively controlling either the operation of the throttle, or the engagement of the clutch, or the simultaneous operation of both the throttle and clutch to thereby effect synchronized operations of the internal-combustion engine and clutch.

5. In an automotive vehicle provided with a clutch and a throttle, power means for operating the clutch, a control valve for said power means, a floating manually operable member accessible to the driver, means interconnecting said manually operable member and said valve, and other means interconnecting said manually operable member and the throttle.

6. In an automotive vehicle provided with a clutch and a throttle, power means for operating the clutch, a control valve for said power means, a foot operated treadle member, a link means interconnecting said member and throttle, and other link means interconnecting said member and valve, said parts being so constructed and arranged that the throttle and valve may be independently, successively or concurrently operated at the will of the driver.

7. In an automotive vehicle provided with a clutch and a throttle, power means for operating the clutch, a control valve for said power means, a foot operated accelerator treadle member, a link pivotally connected to one end of said member and at its other end to the throttle, a second link pivotally connected to the other end of said treadle member and to said valve whereby said treadle may be operated as a lever fulcruming on either of its ends or bodily movable to effect any one of independent, successive or concurrent operations of the throttle and valve.

8. In an automotive vehicle provided with a clutch and an internal-combustion engine having a throttle, power means for operating the clutch, said power means comprising a control valve, and means for operating the throttle and valve comprising a manually operable bodily and angularly movable member.

9. In an automotive vehicle provided with a clutch and an internal-combustion engine having a throttle, power means for operating the clutch, said power means comprising a control valve, and means for operating the throttle and valve comprising an angularly movable, manually operable and slidably mounted member connected at one end to the throttle and at its other end to the valve.

10. In an automotive vehicle provided with a clutch and an internal-combustion engine having a throttle, power means for operating the clutch, said power means comprising a control valve, and means for operating the throttle and valve comprising treadle means, the toe portion of which is operable to actuate the throttle and the heel portion of which is simultaneously operable with the toe portion to actuate the throttle and operate the valve to effect an engagement of the clutch.

11. In an automotive vehicle provided with a clutch and an internal-combustion engine having a throttle, power means for operating the clutch, said power means comprising a control valve, and means for operating the throttle and valve comprising a one-piece, manually operable member pivotally movable about its upper end to effect a clutch disengaging operation of the valve and bodily movable to open the throttle and effect a clutch engaging operation of the valve.

12. In an automotive vehicle provided with a clutch, an engine throttle, power means for operating the clutch, a control valve for said power means, a manually operable control means, means interconnecting said manually operable means, control valve and throttle, and comprising means for effecting a conjoint operation of the throttle and valve and further comprising means for operating the throttle independently of said control valve whereby the relative timing of the operation of the power means and the acceleration of the engine may be controlled at the will of the driver.

HENRY LOYD PIKE.

DISCLAIMER 2,086,364.—*Henry Loyd Pike*, Hampton, Va. AUTOMATIC CLUTCH. Patent dated July 6, 1937. Disclaimer filed November 7, 1938, by the assignee, *Bendix Products Corporation*.

Hereby enters this disclaimer to claims 1 and 8 of said patent.

[*Official Gazette December 6, 1938.*]

name such changes as properly fall within the scope of the appended claims.

Having described the invention what is claimed is:—

1. In a motor operated vehicle including an engine and a clutch for connecting the engine with the drive shaft of the automobile, suction controlled means operatively connected with the clutch and the intake manifold of the engine to operate the clutch, foot operated means to control the operation of the suction operated means, and means connecting the foot operated means with the throttle valve of the engine to operate said throttle valve simultaneously with or independently of the clutch.

2. In an automotive vehicle provided with a clutch and an internal-combustion engine having a throttle, power means for operating the clutch, a control valve for said power means, and common means for independently, concurrently or successively operating the throttle and control valve.

3. In an automotive vehicle provided with a clutch and an internal-combustion engine having a throttle, power means for operating the clutch, a control valve for said power means, and a manually operable member positively interconnecting the throttle and valve and selectively operable for any one of independent, concurrent or successive operations of said throttle and valve to thereby synchronize, at the will of the driver, the speed of the engine and the operation of the clutch.

4. Control mechanism for an automotive vehicle provided with an internal-combustion engine, a throttle therefor, and a clutch, and comprising in combination therewith power operated means for operating the clutch, said means comprising a fluid motor and valve means therefor, and means, operable by the foot of the driver, for selectively controlling either the operation of the throttle, or the engagement of the clutch, or the simultaneous operation of both the throttle and clutch to thereby effect synchronized operations of the internal-combustion engine and clutch.

5. In an automotive vehicle provided with a clutch and a throttle, power means for operating the clutch, a control valve for said power means, a floating manually operable member accessible to the driver, means interconnecting said manually operable member and said valve, and other means interconnecting said manually operable member and the throttle.

6. In an automotive vehicle provided with a clutch and a throttle, power means for operating the clutch, a control valve for said power means, a foot operated treadle member, a link means interconnecting said member and throttle, and other link means interconnecting said member and valve, said parts being so constructed and arranged that the throttle and valve may be independently, successively or concurrently operated at the will of the driver.

7. In an automotive vehicle provided with a clutch and a throttle, power means for operating the clutch, a control valve for said power means, a foot operated accelerator treadle member, a link pivotally connected to one end of said member and at its other end to the throttle, a second link pivotally connected to the other end of said treadle member and to said valve whereby said treadle may be operated as a lever fulcruming on either of its ends or bodily movable to effect any one of independent, successive or concurrent operations of the throttle and valve.

8. In an automotive vehicle provided with a clutch and an internal-combustion engine having a throttle, power means for operating the clutch, said power means comprising a control valve, and means for operating the throttle and valve comprising a manually operable bodily and angularly movable member.

9. In an automotive vehicle provided with a clutch and an internal-combustion engine having a throttle, power means for operating the clutch, said power means comprising a control valve, and means for operating the throttle and valve comprising an angularly movable, manually operable and slidably mounted member connected at one end to the throttle and at its other end to the valve.

10. In an automotive vehicle provided with a clutch and an internal-combustion engine having a throttle, power means for operating the clutch, said power means comprising a control valve, and means for operating the throttle and valve comprising treadle means, the toe portion of which is operable to actuate the throttle and the heel portion of which is simultaneously operable with the toe portion to actuate the throttle and operate the valve to effect an engagement of the clutch.

11. In an automotive vehicle provided with a clutch and an internal-combustion engine having a throttle, power means for operating the clutch, said power means comprising a control valve, and means for operating the throttle and valve comprising a one-piece, manually operable member pivotally movable about its upper end to effect a clutch disengaging operation of the valve and bodily movable to open the throttle and effect a clutch engaging operation of the valve.

12. In an automotive vehicle provided with a clutch, an engine throttle, power means for operating the clutch, a control valve for said power means, a manually operable control means, means interconnecting said manually operable means, control valve and throttle, and comprising means for effecting a conjoint operation of the throttle and valve and further comprising means for operating the throttle independently of said control valve whereby the relative timing of the operation of the power means and the acceleration of the engine may be controlled at the will of the driver.

HENRY LOYD PIKE.

DISCLAIMER 2,086,364.—*Henry Loyd Pike*, Hampton, Va. AUTOMATIC CLUTCH. Patent dated July 6, 1937. Disclaimer filed November 7, 1938, by the assignee, *Bendix Products Corporation*.

Hereby enters this disclaimer to claims 1 and 8 of said patent.

[*Official Gazette December 6, 1938.*]

DISCLAIMER 2,086,364.—*Henry Loyd Pike*, Hampton, Va. AUTOMATIC CLUTCH. Patent dated July 6, 1937. Disclaimer filed November 7, 1938, by the assignee, *Bendix Products Corporation*.

Hereby enters this disclaimer to claims 1 and 8 of said patent.

[*Official Gazette December 6, 1938.*]